United States Patent [19]

Schärer et al.

[11] Patent Number: 5,636,491
[45] Date of Patent: Jun. 10, 1997

[54] FRAME CONSTRUCTION WITH SEVERAL ROD ELEMENTS

[75] Inventors: Paul Schärer, Münsingen; André Gerber, Spiez; Kurt Scherrer, Münsingen, all of Switzerland

[73] Assignee: USM U. Schärer Söhne AG, Münsingen, Switzerland

[21] Appl. No.: 423,809

[22] Filed: Apr. 18, 1995

[30] Foreign Application Priority Data

May 2, 1994 [CH] Switzerland .................. 1357/94

[51] Int. Cl.$^6$ .................................. F16B 12/00
[52] U.S. Cl. ................. 52/655.2; 52/653.1; 403/7; 403/171; 403/176
[58] Field of Search ................. 52/637, 655.2, 52/65.1, 653.1, 653.2, 648.1, 81.3, 86; 403/6, 7, 8, 170, 171, 176, 403; 312/111, 194, 195

[56] References Cited

U.S. PATENT DOCUMENTS

| | | |
|---|---|---|
| 4,501,512 | 2/1985 | Hiltz ........................... 403/170 |
| 4,562,681 | 1/1986 | Smith ......................... 52/637 X |
| 4,637,748 | 1/1987 | Beavers ...................... 403/170 |
| 5,051,019 | 9/1991 | Kohn ........................ 52/655.2 X |
| 5,056,291 | 10/1991 | Leung ........................ 52/637 |
| 5,074,094 | 12/1991 | Gassler ...................... 52/655.2 |
| 5,238,343 | 8/1993 | Scherrer ..................... 411/55 |
| 5,310,273 | 5/1994 | Hara ........................ 403/170 X |

FOREIGN PATENT DOCUMENTS

| | | |
|---|---|---|
| 0400345 | 12/1990 | European Pat. Off. . |
| 0400345 | 8/1993 | European Pat. Off. ....... F16B 13/06 |
| 2306318 | 12/1976 | France .................... 52/637 X |
| 2628460 | 9/1989 | France . |
| 1114749 | 10/1961 | Germany . |
| 9310377 U | 12/1993 | Germany . |

*Primary Examiner*—Michael Safavi

[57] ABSTRACT

A frame construction with several rod elements, which are connected at a node point by a node element (1) that has several holes (2.1, 2.3, . . . , 2.6) which are arranged on principal axes orthogonal to one another in pairs, distinguished in that a hole (2.2) is provided whose axis (s)—located in a plane defined by two principal axes (y, z)—is offset by preferably 15°, at most 20.5°, with respect to one of the two last-mentioned principal axes (y, z).

9 Claims, 3 Drawing Sheets

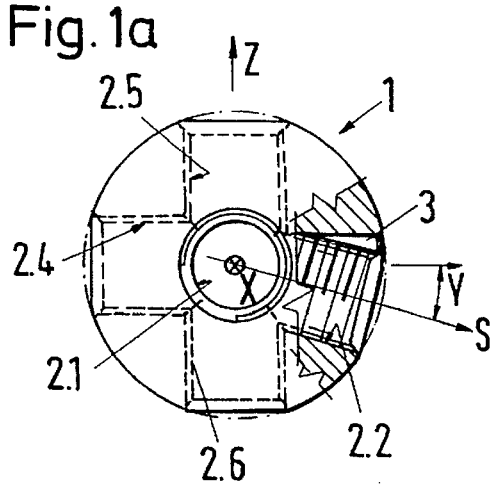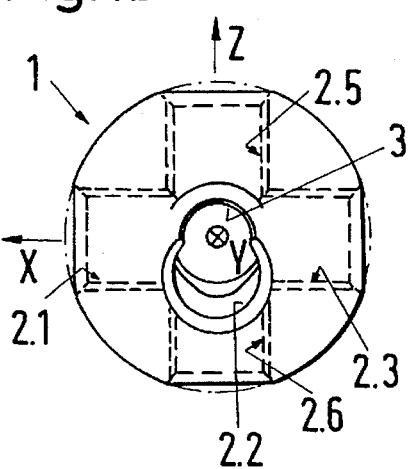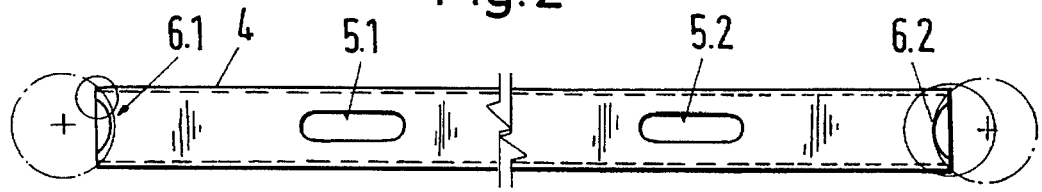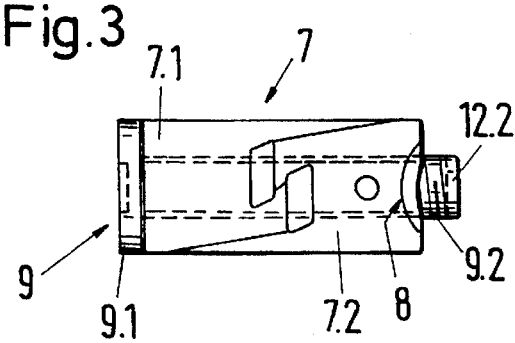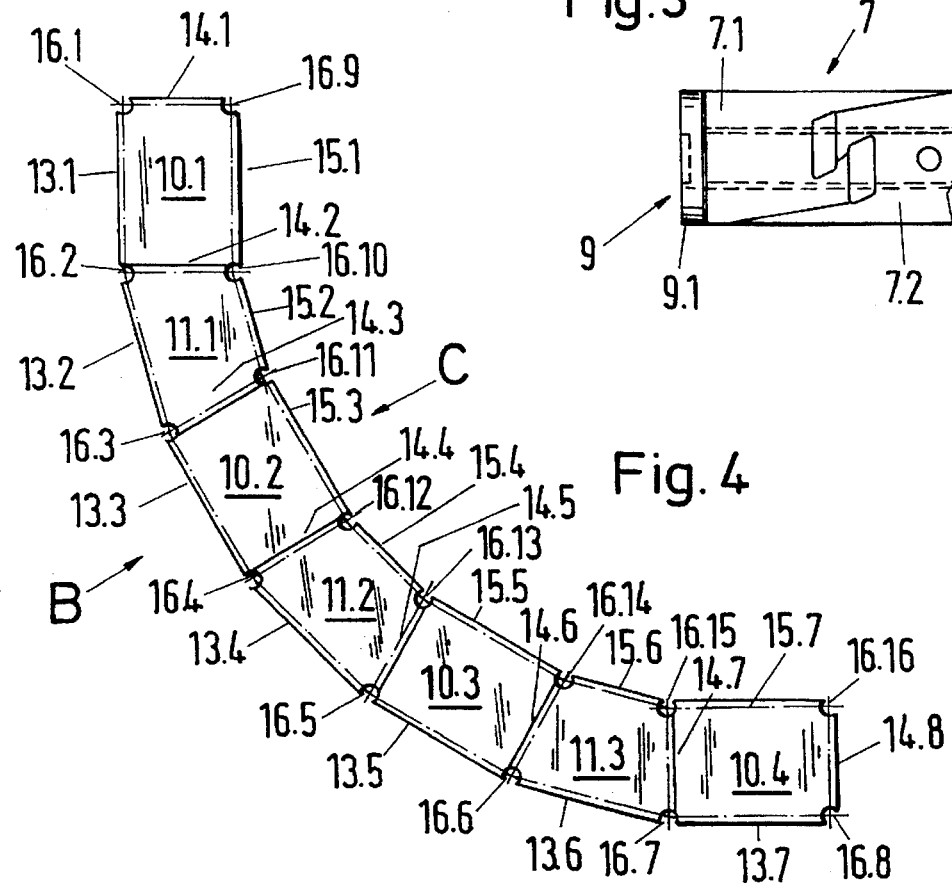

FRAME CONSTRUCTION WITH SEVERAL ROD ELEMENTS

BACKGROUND OF THE INVENTION

Technical Area

The invention relates to a frame construction with several rod elements, which are connected at a node point by a node element that has several holes arranged on principal axes that are orthogonal to one another in pairs. The invention further includes a piece of furniture with such a frame construction.

PRIOR ART

A frame construction of the type mentioned above is known from EP 0 400 345 B1 (USM U. Schörer Söhne AG). A ball with six threaded holes is used for connecting several rod elements (e.g., metal pipes). A specially designed expanding wedge element and a screw are needed to fasten a rod element to the ball. The expanding wedge element is attached to the screw, which is first screwed loosely in a hole of the ball. The rod element is pushed completely over the expanding wedge element. Then, the screw is tightened. The expanding wedge element is designed so that it expands radially under the axial pressure of the screw. As the screw is tightened, it is thus pressed against the inner wall of the rod element.

The six holes of the known ball are arranged on three central axes that project perpendicular to one another in pairs. With the known construction, a multiplicity of designs can be set up as displays, partitions, or the like.

SUMMARY OF THE INVENTION

The object of the invention is now to improve the frame construction mentioned above to the extent that not only rectangular structures, but also curved structures can be implemented. In this case, the improvement sought is to be completely compatible with the already existing construction.

According to the invention, achievement of the object consists in the fact that in a frame construction of the type mentioned above, a hole is provided whose axis—located in a plane defined by two principal axes—is offset by a non-zero angle, not exceeding 20.5°, with respect to one of the last-mentioned principal axes.

A node element according to the invention is distinguished from the previously known node element by a single offset hole. The remaining five holes are arranged as before on axes that project perpendicular to one another in pairs. The invention is thus deliberately limited to allow only one (and not several) angle different from 90° at a node point. Studies have shown that angles up to 20.5° are feasible, depending on design, but the angle is preferably 15°. Then, trapezoidal elements can be achieved which can be combined together with rectangular elements as desired in a regular self-contained ring-shaped polygonal structure. Round furniture, e.g., with a 90° arch, can also be made without the use of additional special elements.

According to an especially advantageous embodiment, the 15° offset hole has a lateral recess that forms an aligned passage for an opposing hole arranged on the principal axis. The recess is preferably shaped like a circular arc. The passage formed by this recess makes it possible to guide a screwdriver through the node element to secure the opposing clamping wedge element. An alternative or additional function of the recess consists of the marking of the 15° offset hole. In this way, even a layman who is not specially trained can assemble it.

The node element is typically spherical. According to an especially preferred embodiment, the holes and node elements have a ratio of diameters of about 1:3. The generally hollow-cylindrical rod elements are accordingly not much smaller in diameter than the ball. The differences in dimension are, e.g., about 20%.

The rod elements are connected to the node element, e.g., with an expanding wedge connector according to EP 0 400 345 B1.

In the design according to the invention, there are two rod elements which—fastened at the node element—form a 75° angle. Thus, the invention also can be implemented with rod or ball cross sections which have comparable diameters, and one of the rod elements is recessed or cut in segments on the front-side end on one side. The recess provides space for the adjacent rod element.

In addition, the expanding wedge connector inserted in the rod element cut on the end side can be chamfered on one side.

In a way known in the art, the rod elements can be provided with a casing-side opening not far from the end of the rod element. The expanding wedge connector can be tightened through the opening with the aid of a special screwdriver.

A piece of furniture—either a rectangular piece of furniture, a trapezoidal piece of furniture, or a combination piece—can in principle be made exclusively with node elements and the corresponding rod elements according to the invention. A round piece of furniture is produced by combining trapezoidal and rectangular furniture elements. With the help of the new frame design, curved furniture and polygon-outline partitions can be made with central angles that correspond to any multiple of 30°.

Other features of the invention are indicated by the detailed description and the totality of the claims.

BRIEF DESCRIPTION OF THE DRAWINGS

The invention is to be explained in detail below based on the embodiments and in connection with the drawings. Here:

FIG. 1a, b show two different views of a ball element according to the invention;

FIG. 2 shows a diagrammatic representation of a side view of a rod with recesses according to the invention;

FIG. 3 shows a diagrammatic representation of a clamping wedge connector with chamfering;

FIG. 4 shows an example of a circular piece of furniture designed from a 90° arch;

In principle, identical parts in the drawings are identified by the same reference symbols.

DESCRIPTION OF THE PREFERRED EMBODIMENT

Figure 5:
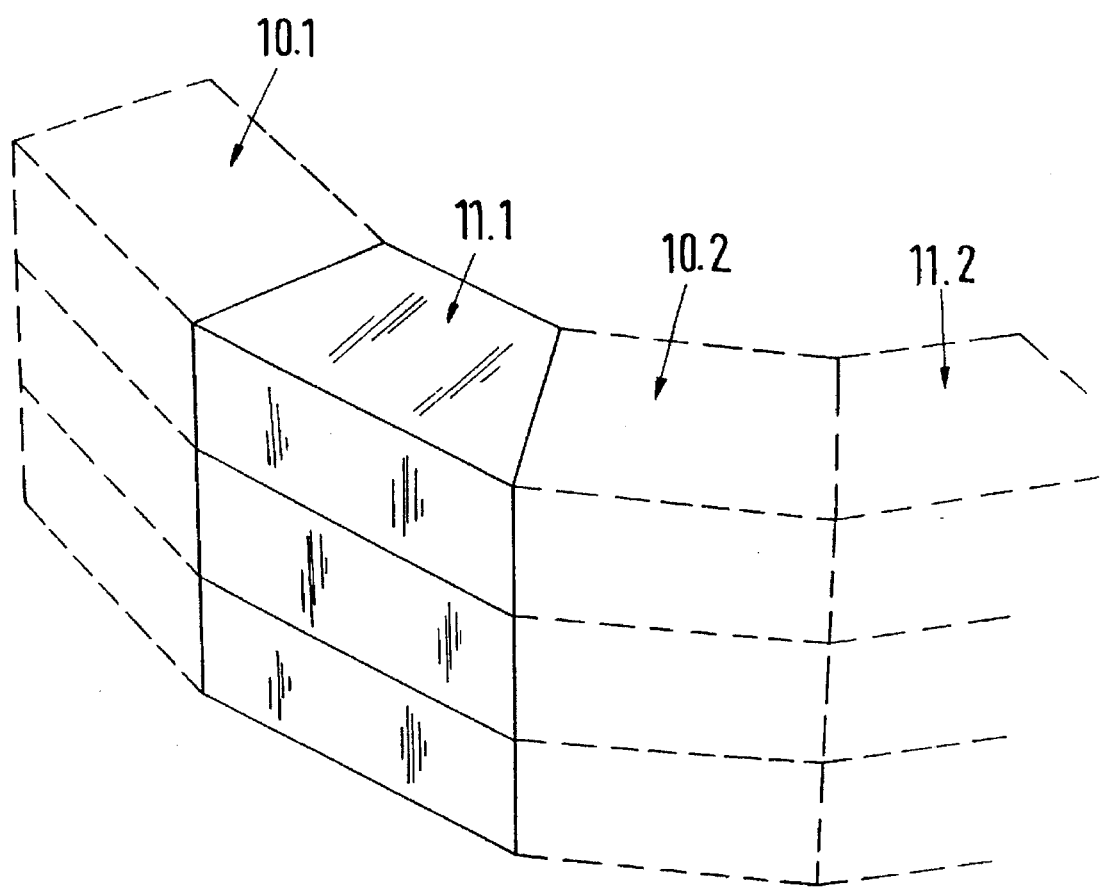
FIG. 5 shows a diagrammatic perspective view of a trapezoidal piece of furniture with adjoining rectangular furniture.

FIG. 1a and b show a preferred embodiment of a ball element 1, whereby FIG. 1b corresponds to a visualization of direction of view A according to FIG. 1a. Ball element 1 is made of metal and has six holes 2.1, ..., 2.6 with inside threading. Five of the six holes are located on three principal axes x, y, and z that project perpendicular to one another in pairs (axes of a rectangular coordinate system). In this example, holes 2.1 and 2.3 are aligned with one another on the x-axis, and holes 2.5 and 2.6 are aligned with one another on the z-axis. Only hole 2.4 is located on the y-axis.

In terms of the invention, hole 2.2 is on an axis s that is different from the above-mentioned principal axis. This axis is located in a plane formed by the y- and z-axis and forms an angle β of 15° with the y-axis. It follows from the above that hole 2.2 forms a 75° angle with hole 2.6 and a 105° angle with hole 2.5. On the other hand, hole 2.2 projects as before at a 90° angle with respect to holes 2.1 and 2.3.

Hole 2.2 has a recess 3, which forms a cylindrical inner surface relative to the y-axis. Recess 3 represents, so to speak, a thread-free hole (or a hole section) located on the y-axis. It makes it possible to insert a tool (e.g., a special screwdriver) into ball element 1 from the side of hole 2.2, which is offset by 15°, to tighten, for example, a screw of a fastening element to be anchored in hole 2.4.

Recess 3 also unmistakably shows which of the six holes is offset by 15°.

The inside diameters of threaded holes 2.1, . . . , 2.6 are, for example, about one-third of the diameter of ball element 1. That is to say, holes 2.1, . . . , 2.6 are relatively large.

FIG. 2 shows a hollow-cylindrical rod 4, which can be connected by an expanding wedge element to hole 2.2 offset by 15°. In a way known in the art, in its casing it has slots 5.1, 5.2 near its ends. Recesses 6.1, 6.2, which are located on one side on the front, are arranged on a common axis or surface line with these slots 5.1, 5.2. These are inclined recesses shaped like segments of a circle.

FIG. 3 shows an expanding wedge element 7 with a screw 9, as described, e.g., by EP 0 400 345 B1 (cf., e.g., FIG. 1, 5, 7 there) cited above. It consists of two halves 7.1, 7.2 that are cut into wedges and engage in one another and is shaped like a cylindrical sleeve. Screw 9 fits into holes 2.1, . . . , 2.6. If screw 9 is tightened, halves 7.1, 7.2 are pressed radially outward under the axial pressure and are braced at the end of corresponding rod 4.

This component, known in the art, is provided, according to the invention, with one-sided chamfering 8, which corresponds to recesses 6.1 and 6.2.

Screw 9 has a first hexagonal connection 12.1 on its head 9.1 and a second hexagonal connection 12.2 on bolt end 9.2. Expanding wedge element 7 can therefore be tightened first by a long screwdriver inserted from the far end of the rod, second by a special screwdriver inserted through closest slot 5.1 or 5.2, and third by a screwdriver guided through the corresponding opposing hole of ball element 1. In the first two assembly variants, the screwdriver is put on head 9.1 and in the third on bolt end 9.2. Recess 3 now guarantees that the tightening of the bolt end (above variant three) can also be done for a screw to be used in hole 2.4.

Figure 6:
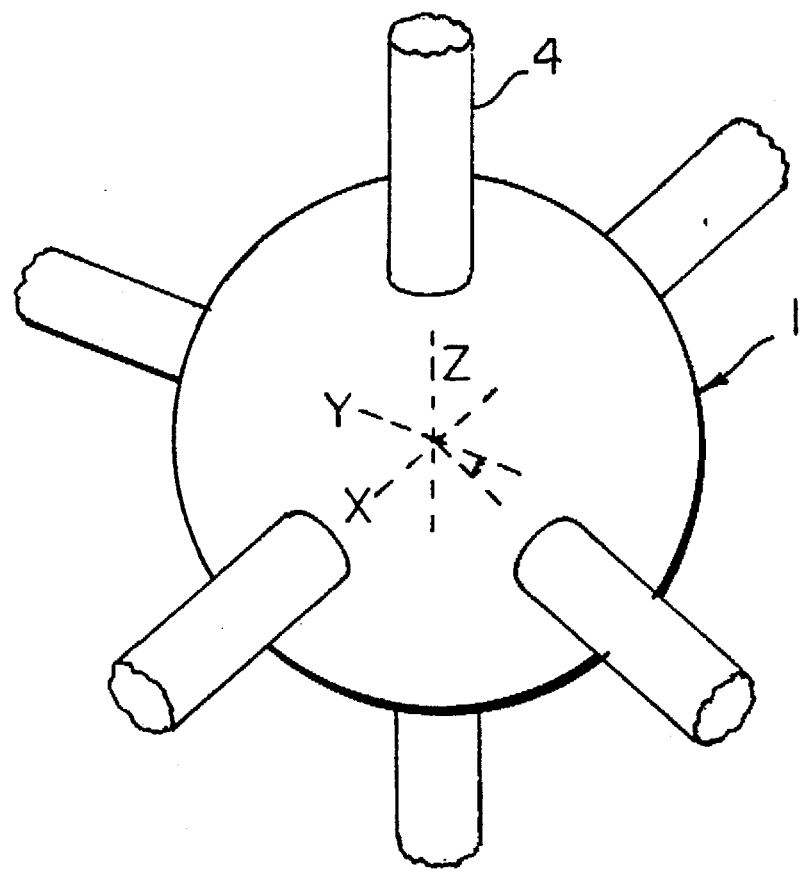
FIG. 6 is a schematic presentation of the inventive ball element with rod elements connected thereto.

FIG. 6 shows the inventive ball 1 element with rod elements 4 connected thereto.

FIG. 4 shows the outline of a round piece of furniture that can be produced with the described joint construction. It consists of four rectangular pieces of furniture 10.1, . . . , 10.4 with trapezoidal pieces of furniture 11.1, . . . , 11.3 used between them in each case. Each trapezoidal piece of furniture 11.1, . . . 11.3 changes the direction of the round piece of furniture by 30°.

In this example the round piece of furniture is provided on the outside with rods 13.1, . . . , 13.7 of the same length. But rods 15.1, . . . , 15.7 of different length are located on the inside depending on whether they correspond to a trapezoidal piece of furniture 11.1, . . . , 11.3 or a rectangular piece of furniture 10.1, . . . , 10.4. Rods 14.1, . . . , 14.8 of the same length are located between outside and inside rods 13.1, . . . , 13.7 or 15.1, . . . , 15.7. The entire construction is connected to node elements 16.1, . . . , 16.16 according to FIG. 1a, b.

It is clear that with node element 16.2, which simultaneously connects rectangular and trapezoidal pieces of furniture 10.1 and 11.1, rods 13.1 and 14.2 project at a right angle to one another, but rods 13.2 and 14.2 form an angle of 75°.

While the round piece of furniture shows a regular polygonal outline from the outside (i.e., viewed from direction B), it appears uneven from the inside (viewed from direction C) since longer sides (15.1, 15.3, 15.5, 15.7) of rectangular piece of furniture 10.1, . . . , 10.4 alternate with shorter sides (15.2, 15.4, 15.6) of trapezoidal piece of furniture 11.1, . . . , 11.3.

The design shown in FIG. 4 has the advantage that rectangular furniture 10.1, . . . , 10.4 can be equipped in a way known in the art with different installation systems (scaffolding, pull-out drawers, etc.) and can be matched optimally to the customers' desires. The less versatile trapezoidal furniture 11.1, . . . , 11.3—which is still quite in demand—is in the minority.

The round piece of furniture can be designed as a single piece or as multiple pieces. It can thus consist, e.g., of two, three, or more shelving elements arranged one above the other.

FIG. 5 shows a perspective view of a part of the round piece of furniture shown in FIG. 4. Trapezoidal piece of furniture 11.1 is indicated by solid lines. It has a depth of, e.g., 30 cm–60 cm, a height of, e.g., 1 m–1.50 m, a short length of, e.g., 30 cm–50 cm and a long side of 40 cm–80 cm. By properly selecting the longitudinal ratios, the curvature of the round piece of furniture can be matched to the respective needs.

It is readily discernible that rings which are closed with the node construction according to the invention, semicircular arches, S-lines, etc. are also possible.

In summary, it can be stated that an amazingly simple way of producing round furniture based on the known and proven construction system has been created by the invention.

We claim:

1. A frame construction for furniture comprising a plurality of rod elements and a ball element, said plurality of rods being connected to said ball element, wherein said ball element has six holes, five holes of said six holes being arranged on first, second and third principal axes that are orthogonal to one another in pairs, and the remaining hole of said six holes being a single offset hole having an axis S located in a plane defined by said first and second principal axes, said axis S being offset by a non-zero angle β not exceeding 20.5° with respect to said first principal axis.

2. The frame construction according to claim 1, wherein said angle β is 15° and the remaining hole has a lateral recess that forms an aligned passage with an opposing hole of said five holes, the opposing hole being arranged on said first principal axis.

3. The frame construction according to claim 1, wherein said ball element is spherical and wherein a diameter of said holes and a diameter of the ball element have a diameter ratio of about 1:3.

4. The frame construction according to claim 1, wherein each of said plurality of rod elements is connected to said ball element by an expanding wedge connector.

5. The frame construction according to claim 2, wherein two of said plurality of rod elements are fastened into a first of said five holes and the remaining hole, respectively, so as to form a 75° angle therebetween, one of said two rod elements being recessed on one side on the front.

6. The frame construction according to claim 5, wherein said one of said two rod elements is chamfered and further comprising an expanding wedge connector disposed in said chamfered rod element, said wedge connector being chamfered on one side on the front corresponding to said recess of said chamfered rod element.

7. The frame construction according to claim 1, wherein said rod elements have at least one opening on a casing side for the insertion of a special screwdriver during assembly.

8. A piece of furniture with frame construction according to claim 2, comprising at least one trapezoidal furniture section, each of said at least one trapezoidal furniture section having a plurality of said ball element.

9. The piece of furniture according to claim 8, further comprising a plurality of rectangular furniture sections, wherein said at least one trapezoidal furniture section is a plurality and wherein said plurality of rectangular furniture sections and said plurality of trapezoidal furniture sections are disposed in alternating adjoining relationship to form an arc-shaped portion.

\* \* \* \* \*